United States Patent [19]

Ryan et al.

[11] 4,450,613

[45] May 29, 1984

[54] METHOD OF MANUFACTURING ACUTE ANGLED VESSEL CONNECTOR

[75] Inventors: Bobby W. Ryan; Rufus A. Rye; James L. Snyder, all of Houston, Tex.

[73] Assignee: WFI International, Inc., Houston, Tex.

[21] Appl. No.: 341,554

[22] Filed: Jan. 21, 1982

[51] Int. Cl.³ ............................................. B21K 21/00
[52] U.S. Cl. ................................. 29/157 T; 29/157 R
[58] Field of Search ................ 29/157 R, 157 T, 256; 285/189, 158, 155, 286

[56] References Cited

U.S. PATENT DOCUMENTS

| | | |
|---|---|---|
| D. 243,456 | 2/1977 | Ryan . |
| D. 243,457 | 2/1977 | Ryan . |
| D. 254,266 | 2/1980 | Tableriou . |
| 1,883,439 | 10/1932 | Adams ................................ 285/189 |
| 1,911,654 | 5/1933 | Taylor ......................... 29/157 R X |
| 2,425,470 | 8/1947 | Hart ..................................... 285/189 |
| 2,479,578 | 8/1949 | Langvand ..................... 29/157 R X |
| 2,736,949 | 3/1956 | Kraemer ............................... 29/157 |
| 3,062,567 | 11/1962 | DeWitt ................................ 285/189 |
| 4,234,217 | 11/1980 | Sakamoto et al. .............. 285/189 X |

FOREIGN PATENT DOCUMENTS

| | | |
|---|---|---|
| 1042643 | 11/1978 | Canada ................................ 285/189 |
| 155954 | 4/1939 | Fed. Rep. of Germany ........ 29/157 |

OTHER PUBLICATIONS

WFI International, Inc. Brochure, 1979.
"Local Components", FIG. 3.14 Special Heavy Wall Fittings.

Primary Examiner—Howard N. Goldberg
Assistant Examiner—Carl J. Arbes
Attorney, Agent, or Firm—Pravel, Gambrell, Hewitt, Kirk & Kimball

[57] ABSTRACT

Method of manufacturing an acute angled vessel connector adapted to be mounted in a vessel or pipeline and to provide an angled connection from such vessel or pipeline to a branch pipe wherein the vessel connector includes a generally cylindrical main body having integrally formed therewith a contoured mounting rim, the main body having a bore therethrough which is directed at a pre-designated acute angle with respect to the annular mounting rim wherein the method includes the steps of providing an offset forging of a particular shape, machining an interior body bore on a central axis separate from the longitudinal axis of the forging itself, facing one end of the forging and milling the other end with a curved undersurface of the same radius of curvature of the vessel or pipeline in which the connector is to be mounted and thereafter completing the machining of the outside surface and otherwise forming the contoured mounting rim of a generally elliptical shape.

6 Claims, 9 Drawing Figures

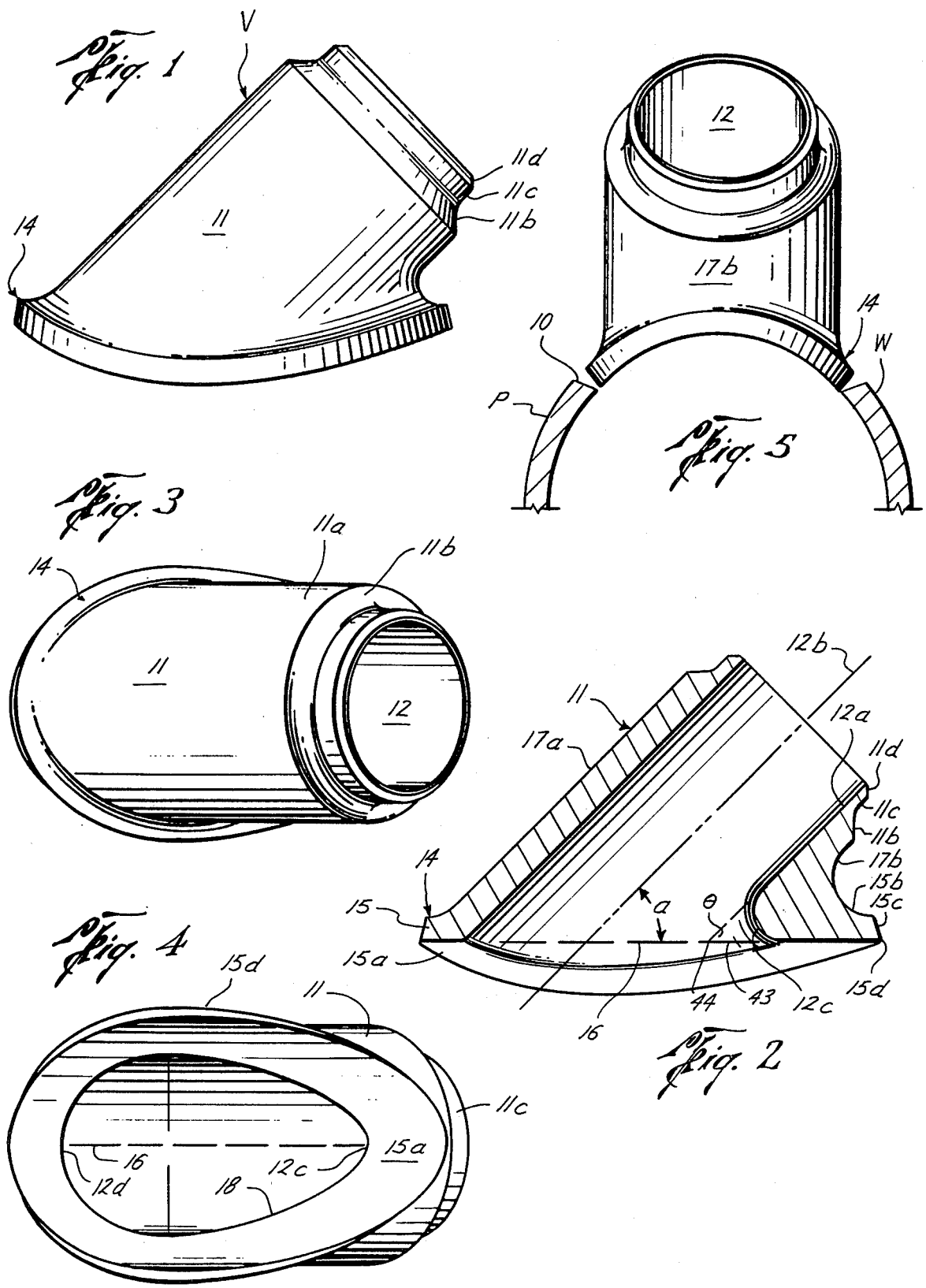

4,450,613

METHOD OF MANUFACTURING ACUTE ANGLED VESSEL CONNECTOR

CROSS REFERENCE TO OTHER APPLICATIONS

This application Ser. No. 341,560, is related to a U.S. Design patent application filed on the same date herewith, which Design application is invented by one of the same inventors as the invention of this application and is assigned to the same assignee. A utility patent application Ser. No. 341,559, on the product of this invention is also filed on the same date as this patent application.

TECHNICAL FIELD OF THE INVENTION

The field of this invention relates to the method of manufacturing a vessel connection.

Vessel connectors for connecting branch piping to vessels or pipelines are well known in the field of industrial construction. Typically, a vessel connector is a one-piece metal coupling having a bore therethrough and having some type of end portion adapted to be welded onto or into the wall of a vessel or other pipeline. The other end of the vessel connector typically has a beveled edge, socket or threaded end which is adapted to be attached to a branch piping of some type. Typically, vessel connectors are welded into a vessel or pipeline such that the bore through the vessel connector extends at a right angle or radially with respect to the wall of the vessel or pipeline. In the past, whenever it has been necessary to connect a branch piping to a vessel or pipeline wherein the branch piping is positioned at an acute angle with respect to the wall of the vessel or pipeline, it has been necessary to use a vessel connector of the type just described and in addition to use a short piece of pipe sometimes known as an "elbow" or "el" which is welded to the outer end of the vessel connector and to the branch piping to provide the necessary turn or angled connection between the vessel connector and the branch piping.

In such a situation where it is necessary to use an elbow and a vessel connector to make an angled connection between a vessel or pipeline and branch piping, it is necessary to weld the vessel connector into the vessel or pipeline and also to weld the elbow to the vessel connector and to the branch piping, a total of three welds. Oftentimes, vessel connectors are used in critical industries such as the nuclear industry or dangerous chemical industries where it is necessary that each weld be x-rayed. The labor cost in machining a weld and x-raying or other weld inspecting makes the cost of each weld important. Further, each additional weld is a point of potential weakness and thus the elimination of welds wherever possible is desirable.

One possible solution to this problem has been manufactured for pipeline application. Such a connector, referred to as a "lateral", includes a main tubular body portion adapted to be fitted into a pipeline and further includes a lateral or angled portion providing a passageway which extends off of the main tubular body portion at an acute angle. In order to use a "lateral" connector, it is necessary to insert the main tubular body portion of the connector into the pipeline and to weld it into place at each end of the connector and then to weld the lateral portion of the connector extending outwardly at an acute angle to the branch piping. This type of "lateral" connector does not eliminate any welds and additionally has limited application since it is necessary to weld the main tubular body portion of such a connector directly into the pipeline.

Vessel connectors used in critical industries, where the usage is at high pressure, and the welds are subject to x-ray, are particularly difficult to manufacture. Typically, in order to provide a connector that will withstand predesignated operating pressures, it is necessary to machine such a fitting from forged steel. Typical vessel connectors, such as that disclosed in U.S. Pat. No. Des. 243,456 are conventionally machined using boring tools, lathes and mills which conventionally bore and machine interior surfaces and exterior surfaces which are typically either parallel to the inside bore or at a right angle with respect thereto.

SUMMARY OF THE INVENTION

It is an object of this invention to provide a new method of manufacturing such vessel connector wherein the connector can be mounted flush into a pipeline or vessel wall and connected to branch piping positioned at an acute angle with respect to such vessel or pipeline.

The vessel connector, which is disclosed in U.S. patent application Ser. No. 341,559, filed on this same date, is formed of an integral housing including a generally cylindrical main body having an interior body bore formed of an interior cylindrical wall and an exterior wall which is at least in part cylindrical. A contoured mounting rim adapted to be mounted flush into a vessel or pipeline wall is formed integrally with one end of the main body. The mounting rim is generally elliptical in configuration and is positioned at a predetermined acute angle with respect to the central axis of the interior body bore. The mounting rim is adapted for welding into a flush position in an opening in a vessel or pipeline so that the generally cylindrical main body and the interior cylindrical body bore extend at a predetermined designated acute angle with respect to the surface of the vessel or pipeline.

According to the method of manufacture of this invention, the acute angled vessel connector is manufactured from an offset forging which is a generally rectangular block having an offset at one end thereof with an approximately diametrical distance from one lower edge at the other end of the offset forging to an upper edge formed by the offset in the block which is greater than the length of the contoured mounting rim to be machined therein.

First, an interior body bore is machined in the offset forging, the bore having a central axis generally parallel to the longitudinal axis of the offset forging and in a direction and at approximately a predetermined acute angle with respect to an imaginary line measuring the diametrical distance across the forging. One end of the forging is then faced so that such one end is precisely perpendicular to the interior body bore. The other end of the forging is then milled to provide a curved undersurface having the same radius of curvature as the vessel or pipeline inside wall in which the annular mounting rim of the finished acute angled vessel connector is to be mounted. The curved undersurface intersects the interior body bore wall in a generally elliptical edge. The outside surface of the forging is then machined into a main body portion which is partly cylindrical in shape and has certain outside wall portions parallel to the cylindrical inside wall forming the interior body bore.

The outside of the other end of the forging having the curved undersurface is then machined to form the annular mounting rim having a ledge portion of gradual curvature meeting the outside cylindrical portions of the main body. The ledge portion is of sufficient width to allow for x-ray inspection of adjacent weld material and is of a gradual curvature meeting the outside cylindrical surface of the main body.

The inner edge of the undersurface of the annular mounting rim is machined such that the portion of the edge directly in the path of fluid exiting the vessel or pipeline and entering the acute angled vessel connector has a substantially larger radius of curvature than the remainder of the inner edge of the undersurface.

These features and other features relating to the method of manufacture of the acute angled vessel connector will be described in greater detail in the description to follow and thereafter, claims will set forth the exact scope of the invention which has been only summarized to this point.

BRIEF DESCRIPTION OF THE DRAWINGS

FIG. 1 is a side view of the acute angled vessel connector to be manufactured according to the method set forth herein;

FIG. 2 is a side view in cross section similar to FIG. 1;

FIG. 3 is a top view of the acute angled vessel connector;

FIG. 4 is a bottom view of the curved undersurface of the annular mounting rim of the acute angled vessel connector;

FIG. 5 is an end view of the acute angled vessel connector illustrating the flush mounting of the annular mounting rim of the connector into a vessel or pipeline;

DESCRIPTION OF THE PREFERRED EMBODIMENT

Figure 6:
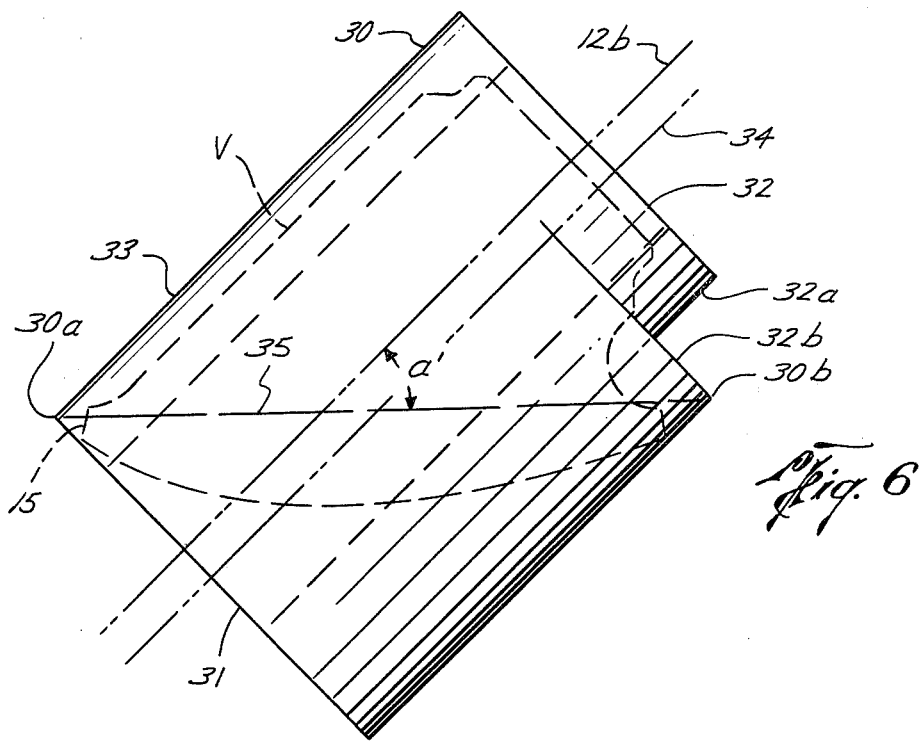
FIG. 6 is a side view of the offset forging used in the manufacture of such acute angled vessel connector illustrating the final product in dotted lines.

Referring to the drawings, the letter V generally designates the acute angled vessel connector which is manufactured in accordance with the method of this invention. The acute angled vessel connector is adapted to be mounted in a vessel or pipeline P. Typically the vessel or pipeline P includes a cylindrical wall portion W such as that illustrated in FIG. 5. An opening or orifice 10 is cut into the cylindrical wall W in a generally elliptical shape to receive the acute angled vessel connector V.

The acute angled vessel connector V includes a generally cylindrical main body 11 having an interior body bore 12 formed by interior cylindrical wall 12a. The main body 11 further has an exterior wall 11a which is at least in part cylindrical and thus concentric with the interior body bore wall 12a. A contoured mounting rim generally designated by the number 14 is formed integrally with the generally cylindrical main body 11 of the vessel connector. The contoured mounting rim is generally elliptical in configuration (FIG. 4) and is positioned at a predesignated acute angle a with respect to the central axis 12b of the interior body bore 12. The central axis 12b of the interior body bore 12 intersects a plane of the undersurface 15a represented by dotted line 16 in FIG. 2 at the predesignated acute angle a. The contoured mounting rim 14 includes an annular mounting ledge 15 adapted to be mounted in the orifice or opening 10 in the vessel or pipeline P and welded in a flush position in the wall W.

The main cylindrical body outside surface 11a has machined therein a section 11b which is tapered to form a section 11c of reduced diameter with respect to the remainder of the main cylindrical outside wall portion 11a. The section 11c of reduced diameter terminates in a beveled edge 11d which is machined in the section 11c of reduced diameter. The beveled edge 11d is adapted to be positioned in abutment to branch piping and welded thereto so that the main bore 12 will provide a passageway from the vessel or pipeline P to branch piping (which is not shown) approaching the vessel V from an acute angle. It should be understood that means other than the beveled edge 11d may be provided for connection to such branch piping including a socket weld type of end portion or a threaded end portion.

The ledge 15 of the contoured mounting rim 14 formed integrally with the main body 11 of the vessel connector V is a generally elliptically-shaped ledge formed of an upper, exterior surface portion 15b, a welding edge 15c and the annular, curved undersurface 15a. The outer, welding edge 15c of the ledge 15 is adapted to be placed in a flush position adjacent to the opening or orifice 10 in the wall W of the vessel or pipeline P so that weld material may be placed between the edge of the opening 10 and the welding edge 15c to weld the vessel connector V into position in the vessel or pipeline P.

The curved undersurface 15a of the annular ledge 15 is in a curved plane which is designated to be of the same radius of curvature as the inside wall of the vessel or pipeline P so that annular mounting rim 14 fits flush with the inside wall of the vessel or pipeline P. The undersurface 15a of the annular mounting rim has been described as being in a curved plane which is represented by dashed line 16 in FIG. 2. The line 16 and thus the plane in which the curved undersurface 15a is located intersects the central axis 12b of the interior cylindrical body bore at a predesignated acute angle a. The mounting of the annular mounting ledge 15 in a flush position in an opening 10 in a vessel or pipeline P positions the interior body bore 12 such that its central axis 12b intersects the interior of wall W of the vessel or pipeline P at the predesignated acute angle a.

The actual degree or size of the acute angle a will depend upon the application. The purpose of the vessel connector V is to provide a vessel connection directly between a branch piping which is positioned at such an acute angle with respect to the inside and outside walls of the vessel or pipeline P. The angle a represents the predetermined acute angle which may be 45° or other angle between the central axis 12b of the interior body bore 12 and the curved undersurface 15a of the annular mounting ledge 15 of rim 14 of the vessel connector V.

The interior cylindrical side wall 12a of the interior body bore 12 is machined such that the inside wall is concentric with and thus parallel to the cylindrical portion of the outside wall 11a. For the purposes of definition, referring in particular to FIG. 2, the cylindrical portion of the outside wall 11a includes the obtuse portion 17a and the "crotch" cylindrical portion 17b. Referring to FIG. 2, the obtuse portion 17a is generally the lefthand side of the fitting as viewed in FIG. 2 and includes a cylindrical surface area of at least 180° wherein the exterior wall thereof is cylindrical in configuration and thus concentric with the radially inwardly positioned inside wall portion 12a of the bore 12. The crotch portion 17b of the fitting is on the right side of the cross sectional view of the connector illustrated in FIG. 2. The crotch portion 17b of the outer cylindrical body wall 11a includes a portion which is cylindrical and thus is concentric with the inside wall 12a of the bore 12. Below the crotch portion 17b is a curved portion of the upper surface 15b of the ledge 15, which upper surface has a radius of curvature sufficient that the outside rim below the crotch portion 17b is of sufficient width to allow for the x-raying or other inspection of the weld formed with welding edge 15c in that area.

The undersurface 15a of the annular mounting ledge 15 intersects the wall 12a of the bore 12 along the generally elliptical edge 18 which is illustrated in FIG. 4 as being concentric to but spaced from the outer edge 15d of the welding edge 15c. The distance between the outer edge 15d and the inner edge 18 of the undersurface represents the thickness of the curved undersurface 15a. The configuration of the inner edge 18 is thus the same as the configuration of the outer edge 15d and outer welding edge 15c. This configuration represents generally an elliptical shape which is formed generally by the intersection of the cylindrical interior bore wall 12a with the plane of the curved undersurface 15a of the annular mounting ledge 15. As viewed in FIG. 4, wherein the line 16 represents the centerline of the generally elliptical inner edge 18 of the annular mounting ledge (as well as a line within the plane of the undersurface 15a as illustrated in FIG. 2), the distance from any point on the centerline 16 to directly opposing points on the outer edge 18 is equal so that the generally elliptical edge 18 is congruous with respect to line 16.

When the vessel connector V is positioned in a vessel or pipeline P and receives fluid, gas or liquid, flowing outwardly of the vessel or pipeline to the branch piping welded onto the beveled end 11d, the flow of the fluid into the interior body bore 12 is such that the interior bore portion 12c positioned inwardly from the outside crotch portion 17b of the vessel may receive the direct impact of such flowing fluid. In order to reduce turbulence within the area or zone of the interior bore portion 12c which receives the direct impact of fluid flow, the interior bore portion 12c is machined to a radius of curvature which is equal to the radius of curvature of the upper surface 15b of the ledge 15 positioned directly outwardly from such bore zone 12c which receives direct fluid impingement. The radius of curvature of this zone 12c is substantially larger than the radius of curvature of the remaining edge 18, which radius of curvature gradually reduces from a maximum in the area 12c to a minimum in the locus 12d which is located diametrically opposite along imaginary line 16 from the bore zone 12c. The radius of curvature of the edge 18 is machined to smoothly decrease from its maximum in the area 12c to its minimum in the edge area 12d. The radius of curvature in the zone of impact 12c is measured in the plane of the drawing of FIG. 2 perpendicular to the plane of the curved undersurface 15a.

The acute angled vessel connector V is manufactured in the preferred embodiment of this invention in accordance with the method schematically illustrated in FIGS. 2 and 6–9. Referring first to FIG. 6, an offset forging 30 is provided wherein the forging is a generally rectangular or cylindrical block of suitable steel or other material. The offset forging of FIG. 6 has generally opposing flat end surfaces 31 and 32 and a generally cylindrical outer surface 33. One end 32 includes an offset formed by shoulders 32a and 32b. It is believed the unique configuration of FIG. 6 is most efficient to the formation of the acute angled vessel connector V which is illustrated in dotted lines within the offset forging 30. The longitudinal axis and centerline of the offset forging is identified by line 34. The overall size of the offset forging is such that the distance of a diagonal line 35 extending from lower forging edge 30a to upper forging offset edge 30b is slightly greater than the largest dimension of the generally annular ledge 15 of the finally machined vessel connector V. Generally, the forging longitudinal axis 34 intersects the line 35 at an angle a', which is approximately the predesignated angle for the relative position of the centerline 12b of the interior bore 12 with respect to the plane of the undersurface 15a of the annular mounting ledge 15 of the completed vessel connector V.

The interior body bore generally designated as 12 is now bored into the offset forging 30. However, the central axis 12b (see also FIG. 2) for the interior body bore is not coincident with the centerline 34 of the offset forging itself. The interior bore 12 as originally drilled may be slightly smaller than the actual size of the final bore; however, that matter is left up to a choice of design. In either situation, the interior cylindrical wall 12a of the final bore 12 is generally parallel to the exterior generally cylindrical forging wall 33 and is generally perpendicular to the ends 31 and 32 thereof.

One end 32 of the forging is now machined such that it is faced off precisely perpendicular to the central axis 12b of the bore 12 and its surface corresponds to the actual outer edge of the bevel end (FIG. 2) of the eventually finished vessel connector V.

The outside wall 33 of the offset forging is now machined to provide a generally curved, smooth surface perpendicular to the flat, faced off end 32 of the forging.

Figure 7:
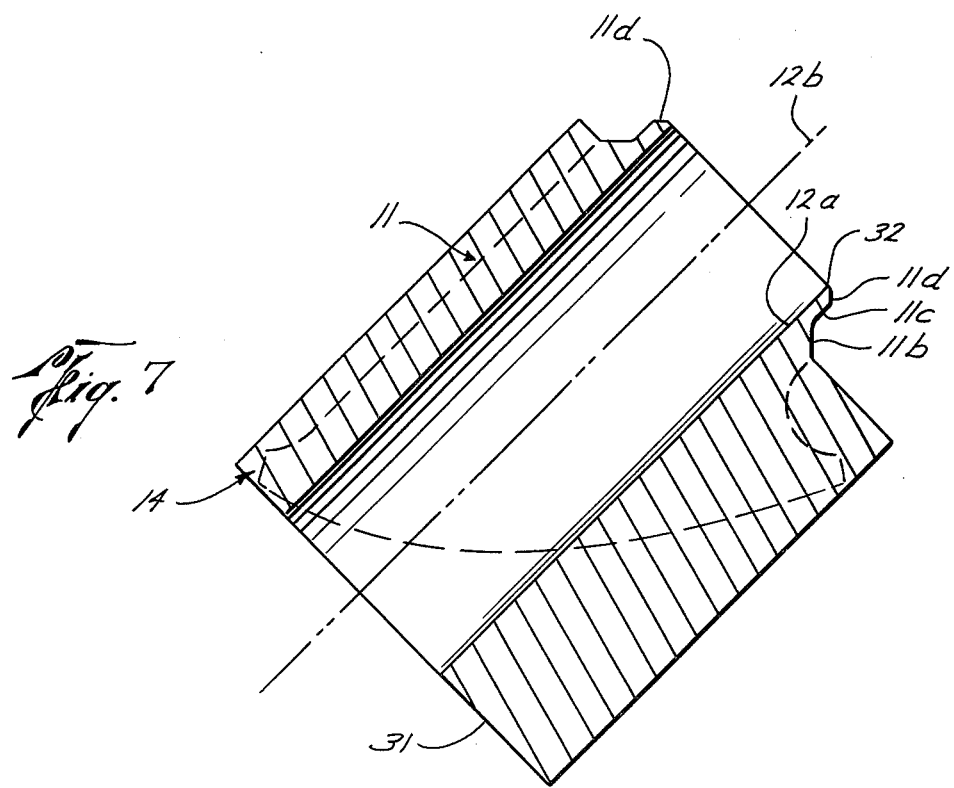
FIG. 7 is a sectional view of the offset forging of FIG. 6 with the interior body bore machined therein and having a section of reduced diameter adapted to be welded to branch piping machined therein.

Referring to FIG. 7, the upper portion of the exterior wall 11a of the main body 11 is now machined into final form. The exterior tapered section 11b is machined out of the forging and the reduced diameter section 11c and final bevel 11d are also machined virtually simultaneously so that the upper end of the main body 11 is finalized.

Figure 8:
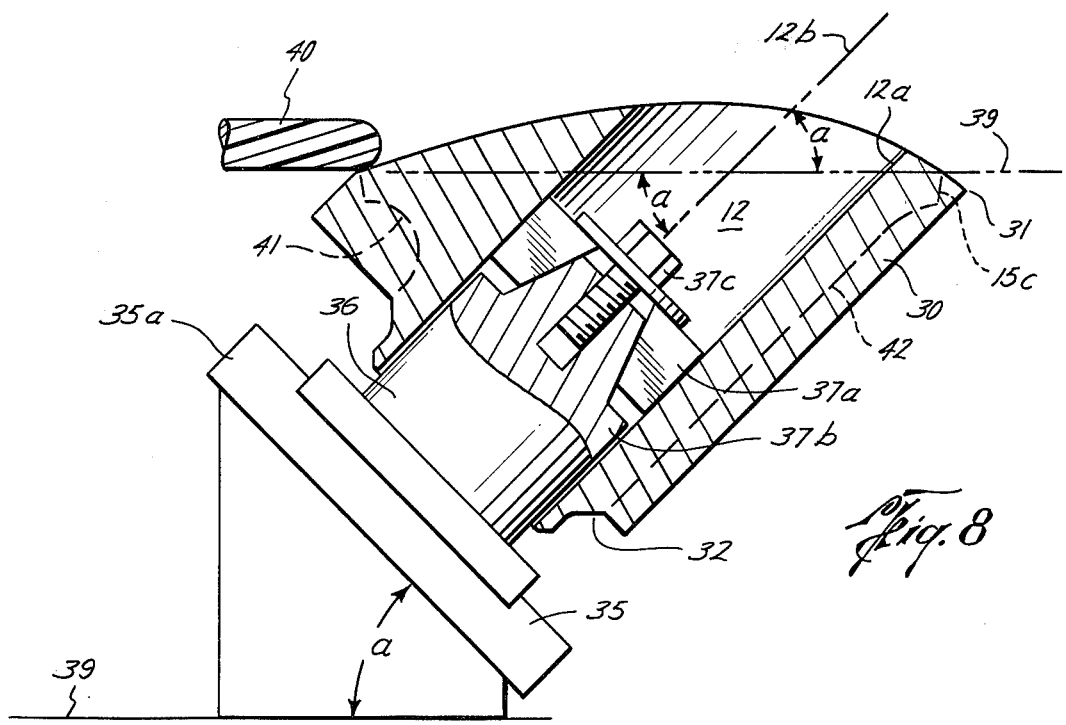
FIG. 8 is a side view partly in section of the partially manufactured acute angled vessel connector and illustrating schematically the positioning of the acute angled vessel connector so that the curved undersurface of the annular mounting rim can be machined therein at a predesignated angle with respect to the interior body bore.

Referring now to FIG. 8, the partly machined offset forging 30 is turned upside down so that its other end 31 is facing upwardly and the partly machined end 32 is facing downwardly. A cylindrically-shaped jig 35 is provided to hold the now inverted forging 30 in the position of FIG. 8. The jig 35 as schematically illustrated includes a table 35a which is held at the predetermined angle a with respect to the horizontal. A cylindrical holding member 36 is mounted onto the table 35a and extends into the bore 12 of the partly machined vessel connector V. A suitable arrangement of slotted slip members 37a mounted in a cylindrical support 37b are moved radially outwardly through an actuator bolt 37c in a manner known in the art. Thus the cylindrical portion 36 of the jig 35 mounts the partly machined vessel connector V in such position that the central axis 12b of the internal bore 12 is positioned at the predetermined angle a with respect to the horizontal, the horizontal being represented by lines 39. Utilizing a suitable milling machine which provides a rotating milling tool 40, the curved undersurface 15a is now machined into the end 31 of the forging 30. Utilizing known milling guide mechanisms, the milling tool 40 machines out the curved undersurface 15a having the same radius of curvature as the inside wall of the vessel or pipeline P. The milling tool 40 is advanced along a curved plane represented by the horizontal line 39 so that the curved plane of the undersurface 15a is positioned at the predesignated angle a with respect to the central axis 12b of the internal bore 12.

The outside surface 33 of the main body 11 is now machined into a final form along the dotted lines 41 and 42 in FIG. 8. The final main body 11 has an outside surface 11a which, as previously described, includes a large cylindrical portion on the oblique side 17a (FIGS. 2 and 9) and a smaller cylindrical portion on the crotch side 17b. The outside surfaces forming these cylindrical portions are concentric with the inside wall 12a of the bore 12. At the same time, the welding outer wall edge 15c is machined to its final, generally elliptical shape.

Figure 9:
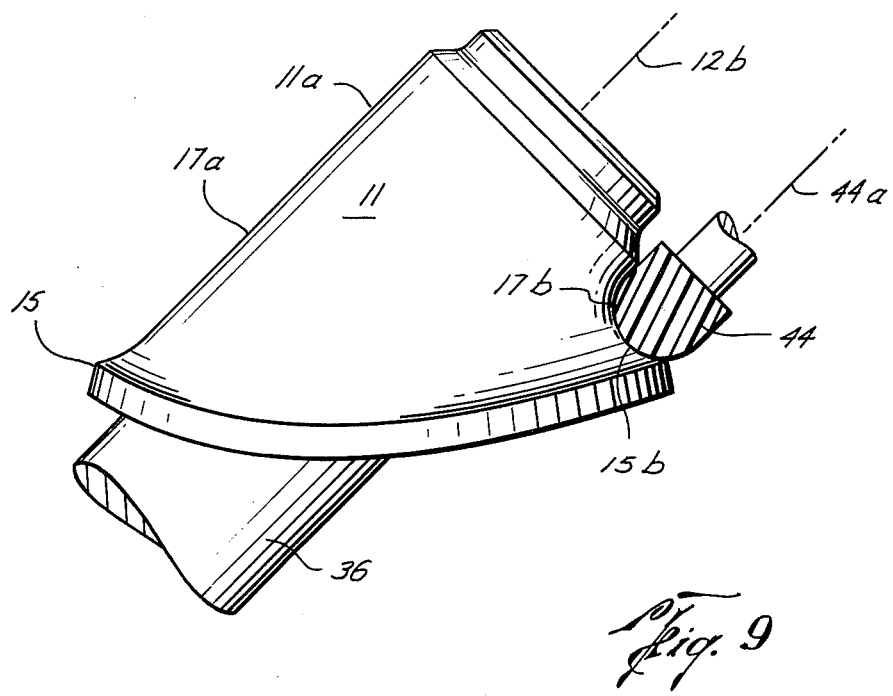
FIG. 9 is a side view illustrating the positioning of the milling tool which machines the exterior radius of curvature in the crotch portion of the vessel connector.

Referring now to FIG. 9, the exterior surface in the crotch area 17b of the connector is machined to a final radius of curvature which is sufficiently large to provide the annular mounting ledge 15 with sufficient exterior wall surface area 15b to allow for proper x-ray or other inspection of the final welded connection between the outer ledge 15 and the wall of the opening 10 in the vessel or pipeline P. The jig support 36 is now positioned in bore 12 in the connector end having mounting rim 14 to hold the almost completed vessel connector in position during the machining of the crotch 17b. The milling tool 44 for machining the radius in crotch area 17b is rotated on an axis 44a parallel to bore axis 12b and at angle a with respect to undersurface 15a.

At this point, the undersurface 15a yet includes a portion 43 shown in dotted lines in FIG. 2 which is in the zone of impact of fluid entering the installed vessel connector. This area 43 in the zone of fluid impact is now machined to a final radius of curvature 12c which is equal to the radius of curvature in the crotch area 15b of the exterior wall portion 11a. Utilizing a large radius of curvature in zone 12c of fluid impact serves to reduce turbulence and allow for smoother flow of fluid outwardly through the vessel connector V.

Prior to actually machining the zone of fluid impact 12c to a final radius of curvature equal to that in the area of the exterior wall portion 15b, measurements are taken from point 44 to confirm that the position of the bore 12 and all other dimensions are proper.

The inner edge of the undersurface 15a has been designated as 18. The portion of the inner edge in the zone 12c of direct fluid impact has the largest radius of curvature of any portion of the inner undersurface edge 18. The edge area 12d of smallest radius of curvature along the inner edge 18 is located diametrically across from the area 12c of largest radius of curvature. And, the radius of curvature between the area 12d of smallest radius and the area 12c of largest radius of curvature is in gradual change from one radius to the other. This is accomplished by final machining of the product.

The vessel connector V as manufactured by the preferred embodiment of this invention is provided for making a welded connection in a vessel or pipeline P and for connection to branch piping positioned at an acute angle with repect to the outside wall of such vessel or pipeline P. The annular ledge 15 of the vessel connector V is of sufficient width to allow for x-raying or other inspection of the weld between welding edge 15c and the walls of the vessel or pipeline P. The undersurface 15a of the vessel connector V is curved to provide an uninterrupted, smooth and flush fit of the undersurface with the inside wall of the vessel connector or pipeline P. The vessel connector V is manufactured from a single forging piece 30 in the steps described here so that it may be manufactured out of the highest quality forged steel. In order to machine the vessel connector V from the forging piece, the connector is positioned such that the main body 11 will, as finally machined, be parallel to the longitudinal axis 34 of the offset forging. The material is suitable to match the high quality design of the connector so that it may be used in critical industry application such as the nuclear industry and the like.

The foregoing disclosure and description of the invention are illustrative and explanatory thereof, and various changes in the size, shape and materials as well as in the details of the illustrated construction may be made without departing from the spirit of the invention.

What is claimed is:

1. Method of manufacturing an acute angled vessel connector adapted to be mounted in a vessel or pipeline and to provide an angled connection from such vessel or pipeline to a branch pipe wherein the vessel connector includes a generally cylindrical main body having integrally formed therewith a contoured mounting rim, said main body having a bore therethrough which is directed at a predesignated acute angle with respect to said annular mounting rim, comprising the steps of:
   providing an offset forging which is a generally rectangular block having an offset at one end thereof with an approximately diametrical distance from one lower edge at the other end of said forging to an upper edge formed by said offset which is greater than the length of the contoured mounting rim to be machined therein;
   machining an interior body bore having a cylindrical inside wall with a central axis in said offset forging generally parallel to the longitudinal axis of the forging and approximately at a predesignated acute angle with respect to an imaginary line extending diametrically across said forging;
   facing said one end of said forging so that said one end is precisely perpendicular to said interior body bore;
   milling said other end of said forging to provide a curved undersurface which has the same radius of curvature as the vessel or pipeline inside wall in which said contoured mounting rim is to be welded, said curved undersurface intersecting said interior body bore wall in an inner, generally elliptical edge;
   machining said forging outside surface into a main body which is partially cylindrical in shape and having certain outside wall portions parallel to said cylindrical inside wall forming said interior body bore and an edge portion of said contoured mounting rim in a generally elliptical shape;

machining said other end of said forging having said curved undersurface into a contoured mounting rim having an exterior ledge portion of gradual curvature, said ledge portion being of sufficient width to allow for x-ray inspection of adjacent weld material, said ledge portion of gradual curvature meeting said outside cylindrical surface of said main body; and machining said inner edge of said curved undersurface such that said portion of said edge directly receiving fluid flow has a substantially larger radius of curvature than the remainder of said inner edge of said undersurface.

2. The method set forth in claim 1, including:

machining said interior body bore in said forging such that the central axis thereof is located off of the center of said offset forging.

3. The method set forth in claim 1, including the steps of:

prior to milling said undersurface, machining to final design said one end of said forging including a section of reduced diameter having a beveled edge adapted to be welded to a branch pipe.

4. The method set forth in claim 1, wherein said curved undersurface of said contoured mounting rim is formed by the following steps:

positioning said offset forging having said interior body bore with said one face directed downwardly;

inserting a jig into said interior body bore and positioning said offset forging such that said other end thereof is directed upwardly; and milling in said other end of said offset forging an undersurface having a curvature equal to the curvature of the vessel or pipeline in which said vessel connector will be mounted, the curved plane of said undersurface intersecting said central axis of said interior body bore at said predetermined acute angle.

5. The method set forth in claim 1, wherein the step of machining said contoured mounting rim includes the step of:

positioning a milling tool such that the milling tool rotates about an axis at said predesignated angle with respect to said undersurface and parallel to the central axis of said bore.

6. The method set forth in claim 5, wherein:

machining a certain radius of curvature in said annular mounting rim in the area of the smallest portion of cylindrical outside wall; and machining said inner edge of said undersurface in said portion directly receiving fluid flow to the said radius of curvature of said annular mounting rim curvature located radially outwardly therefrom, which is the area of the smallest portion of cylindrical outside wall.

* * * * *

UNITED STATES PATENT AND TRADEMARK OFFICE
CERTIFICATE OF CORRECTION

PATENT NO. : 4,450,613

DATED : May 29, 1984

INVENTOR(S) : Bobby W. Ryan; Rufus A. Rye; James L. Snyder

It is certified that error appears in the above-identified patent and that said Letters Patent is hereby corrected as shown below:

In column 1, line 7: please delete "Ser. No. 341,560".

In column 1, line 8: please insert "Ser. No. 341,560" between the words "application" and "filed".

In column 6, line 27: please delete "Ine" and insert therefor --line--.

Signed and Sealed this

Thirteenth Day of November 1984

[SEAL]

Attest:

GERALD J. MOSSINGHOFF

Attesting Officer

Commissioner of Patents and Trademarks